United States Patent
Nakayama

(10) Patent No.: US 9,727,755 B2
(45) Date of Patent: *Aug. 8, 2017

(54) PROCESSING INFORMATION

(71) Applicant: International Business Machines Corporation, Armonk, NY (US)

(72) Inventor: Kiyotaka Nakayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,711

(22) Filed: Oct. 15, 2015

(65) Prior Publication Data

US 2016/0034720 A1    Feb. 4, 2016

Related U.S. Application Data

(63) Continuation of application No. 14/028,998, filed on Sep. 17, 2013, now Pat. No. 9,208,351, which is a (Continued)

(30) Foreign Application Priority Data

Dec. 26, 2006  (JP) .................................. 2006-349217

(51) Int. Cl.
*G06F 11/30*       (2006.01)
*G06F 21/79*       (2013.01)
(Continued)

(52) U.S. Cl.
CPC .......... *G06F 21/79* (2013.01); *G06F 11/1008* (2013.01); *G06F 21/62* (2013.01);
(Continued)

(58) Field of Classification Search
CPC ......... G06F 21/10; G06F 21/604; G06F 21/64
(Continued)

(56) References Cited

U.S. PATENT DOCUMENTS 5,485,474 A * 1/1996 Rabin ................... G06F 11/004
                                                    714/762
6,469,803 B1 * 10/2002 Kato .................. H04N 1/00912
                                                    358/1.14

(Continued)

FOREIGN PATENT DOCUMENTS

JP    PUPA63301389     12/1988
JP    PUPA200273422    3/2002

(Continued)

OTHER PUBLICATIONS

NTT Com "Secure USB Memory Service" with Secret Sharing Method; [English Translation—1 page] of Japanese News article on Secure USB Memory Service provided by NTT communications. [online]. 1 page. [retrieved on Feb. 18, 2009]; webpage < URL: http://enterprise.watch.impress.co.jp/cda/security/2005/03/24/4901.html>.

(Continued)

*Primary Examiner* — Tae Kim
*Assistant Examiner* — Peiliang Pan
(74) *Attorney, Agent, or Firm* — Schmeiser, Olsen & Watts; John Pivnichny

(57) ABSTRACT

A method and system for processing information. An apparatus divides target information into N pieces of divided data using a secret sharing scheme in which a predetermined number (K) of pieces of the N pieces of divided data is required to restore the target information, wherein N>K. The apparatus is an information processing device or an external storage device. The apparatus selects M pieces from the N pieces (K<M<N). After selecting the M pieces, the M pieces are stored in the external storage device which limits a totality of pieces of the N pieces being stored on the external storage device to the M pieces. After storing the M pieces, the target information is restored from at least K pieces of (Continued)

the N pieces after which D pieces of the M pieces in the external storage device are destroyed (D>M−K).

18 Claims, 10 Drawing Sheets

Related U.S. Application Data continuation of application No. 12/519,209, filed as application No. PCT/JP2007/074684 on Dec. 21, 2007, now abandoned.

(51) Int. Cl.
| | | |
|---|---|---|
| *G06F 11/10* | (2006.01) | |
| *G06F 21/62* | (2013.01) | |
| *G06F 21/64* | (2013.01) | |
| *H04L 9/08* | (2006.01) | |
| *G06F 21/85* | (2013.01) | |
| *H04L 9/32* | (2006.01) | |

(52) U.S. Cl.
CPC ............. *G06F 21/64* (2013.01); *G06F 21/85* (2013.01); *H04L 9/085* (2013.01); *H04L 9/3271* (2013.01); *H04L 9/3297* (2013.01); *G06F 2201/84* (2013.01); *G06F 2221/2107* (2013.01); *G06F 2221/2137* (2013.01); *G06F 2221/2143* (2013.01); *G06F 2221/2151* (2013.01); *H04L 2209/80* (2013.01)

(58) Field of Classification Search
USPC ........................................ 713/165, 167, 193
See application file for complete search history.

(56) References Cited

U.S. PATENT DOCUMENTS

| | | | | |
|---|---|---|---|---|
| 7,418,620 | B1* | 8/2008 | Tormasov | G06F 11/1076 714/6.24 |
| 7,472,334 | B1* | 12/2008 | Scott | H03M 13/151 714/785 |
| 2003/0051054 | A1* | 3/2003 | Redlich | G06F 21/6209 709/246 |
| 2005/0239494 | A1* | 10/2005 | Klassen | G06F 8/62 455/550.1 |
| 2006/0152582 | A1* | 7/2006 | Uchida | G02B 21/365 348/79 |
| 2006/0236409 | A1 | 10/2006 | Kuehnel et al. | |
| 2014/0019774 | A1 | 1/2014 | Nakayama | |

FOREIGN PATENT DOCUMENTS

| | | |
|---|---|---|
| JP | 2006172351 | 6/2006 |
| JP | PUPA2006195719 | 7/2006 |
| JP | 2006301849 | 11/2006 |
| JP | 2006309395 | 11/2006 |
| WO | 03012666 | 2/2003 |
| WO | WO2006118122 | 11/2006 |

OTHER PUBLICATIONS iDEA CS; [English Translation—2 pages] of iDEA CS provided by Mitani Corporation.[online]. 2 pages. [retrieved on Feb. 18, 2009]; webpage < URL: http://tkinfo.mitani-corp.co.jp/product/idea_cs.html>.
Notice of Allowance (Mail Date Jul. 9, 2013), for U.S. Appl. No. 12/519,209, filed Jun. 15, 2009, First Named Inventor Kiyotaka Nakayama.
Examiner's Amendment (Jun. 28, 2013), for U.S. Appl. No. 12/519,209, filed Jun. 15, 2009, First Named Inventor Kiyotaka Nakayama.
Appeal Brief (Apr. 19, 2013), for U.S. Appl. No. 12/519,209, filed Jun. 15, 2009, First Named Inventor Kiyotaka Nakayama.
Notice of Appeal (Feb. 21, 2013), for U.S. Appl. No. 12/519,209, filed Jun. 15, 2009, First Named Inventor Kiyotaka Nakayama.
Advisory Action (Jan. 17, 2013), for U.S. Appl. No. 12/519,209, filed Jun. 15, 2009, First Named Inventor Kiyotaka Nakayama.
Response (Dec. 24, 2012), for U.S. Appl. No. 12/519,209, filed Jun. 15, 2009, First Named Inventor Kiyotaka Nakayama.
Final Office Action (Mail Date Oct. 23, 2012), for U.S. Appl. No. 12/519,209, filed Jun. 15, 2009, First Named Inventor Kiyotaka Nakayama.
Response (Aug. 8, 2012), for U.S. Appl. No. 12/519,209, filed Jun. 15, 2009, First Named Inventor Kiyotaka Nakayama.
Office Action (Mail Date May 8, 2012), for U.S. Appl. No. 12/519,209, filed Jun. 15, 2009, First Named Inventor Kiyotaka Nakayama.
Response (Mar. 30, 2012), for U.S. Appl. No. 12/519,209, filed Jun. 15, 2009, First Named Inventor Kiyotaka Nakayama.
Office Action (Mail Date Jan. 4, 2012) for U.S. Appl. No. 12/519,209, filed Jun. 15, 2009, First Named Inventor Kiyotaka Nakayama.
Preliminary Amendment (Jun. 15, 2009), for U.S. Appl. No. 12/519,209, filed Jun. 15, 2009, First Named Inventor Kiyotaka Nakayama.
Publication (Feb. 4, 2010), for U.S. Appl. No. 12/519,209, filed Jun. 15, 2009, First Named Inventor Kiyotaka Nakayama.
International Search Report, Reference JP920060136EP1, Application No. 07859964.4-1957/2116955 PCT/JP2007074684, Date Apr. 7, 2014, 8 pages.
International Search Report (2-claims), Reference JP920060136EP1, Application No. 07859964.4-1957/2116955 PCT/JP2007074684, Date Apr. 7, 2014, pp. 24-28.
Notice of Allowance (Jul. 24, 2015) for U.S. Appl. No. 14/028,998, filed Sep. 17, 2013.

* cited by examiner

PROCESSING INFORMATION

PROCESSING INFORMATION

This application is a continuation application claiming priority to Ser. No. 14/028,998, filed Sep. 17, 2013, now U.S. Pat. No. 9,208,351, issued Dec. 8, 2015, which is a continuation of Ser. No. 12/519,209, filed Jun. 15, 2009, now Abandoned, filed as a National Stage Entry of PCT/JP2007/074684 on Jun. 15, 2009 and claiming foreign priority based on application 2006349217 filed on Dec. 26, 2006 in Japan.

TECHNICAL FIELD

This invention relates to an information conversion technology, particularly, to an information conversion technology used when information acquired from an information processing system is stored in an external storage device.

BACKGROUND ART

In recent years, portable storage devices such as a universal serial bus (USB) memory, a Compact Flash memory, or a secure digital (SD) memory card have widely been used. Also, their storage capacities have been increased. These storage devices are able to give and receive an enormous amount of data even if an adequate communication environment is not established between multiple information processing devices. Thus they are highly convenient to use. Further these storage devices include non-volatile memory devices such as flash memories, so they can store data for an extended period of time without requiring a power supply, thereby providing a wide range of applications.

The following references will be described later.
[Patent Document 1] Japanese Unexamined Patent Application Publication No. 63-301389
[Patent Document 2] Japanese Unexamined Patent Application Publication No. 2006-195719
[Patent Document 3] Japanese Unexamined Patent Application Publication No. 2002-73422
[Non-Patent Document 1] Japanese News article on Secure USB Memory Service provided by NTT communications, webpage URL "http://enterprise.watch.impress.co.jp/cda/security/2005/03/24/4901.html", searched on Dec. 20, 2006
[Non-Patent Document 2] Idea CS provided by Mitani corporation, webpage URL "http://tkinfo.mitani-corp.co.jp/product/idea_cs.html", searched on Dec. 20, 2006

DISCLOSURE OF THE INVENTION

Problems to be Solved by the Invention

While such storage devices have been widely and casually used for their user-convenience, portability and lowered price, these devices have had a problem in that confidential information may be leaked due to the loss thereof. For example, these storage devices may be lost during carriage thereof due to their small size or may be inserted into a somebody else's information processing device and then left behind. In such cases, a malicious user can instantly acquire an enormous amount of stored data in its entirety. In other words, once these storage devices have been lost, their advantages can be turned into disadvantages, causing an inconvenience to a valid user.

On the other hand, it has been a practice to encrypt data to be stored to a storage device so as to be decryptable only for a valid user. However, even such encryption may be insufficient for security for the following reasons. First, if a storage device is inserted into an information processing device and then left behind, encryption of data has already been permitted by a valid user, so a malicious user also can refer to the data as it is. Second, a valid user may forget a password for decryption. Even if the valid user remembers the password, it is troublesome to enter the password each time the user refers to the data. Third, the information processing device requires software for encryption and decryption. Therefore, if the information processing device does not include a particular operating system (for example, Windows (registered trademark)), it may not be able to use such software.

Specifically, USB memory devices that use a secret sharing scheme to make it difficult for a person other than a valid user to read data are proposed in Non-Patent Documents 1 and 2. However, with regard to the devices described in these documents, all decryptable pieces of the original data are not stored in the devices per se and some pieces of the data are stored in the user's personal computer (referred to as a "PC") or the like. Accordingly the user's PC or the like is required to restore the original data. The user's PC or the like requires software dedicated to data restoration. Further, these memory devices cannot be used from a PC other than one provided with such dedicated software.

Fourth, even encryption cannot prevent a malicious user from referring to data. This is because encryption is just a "conversion in which it is very difficult to perform a computation for inverse conversion at the time of the encryption." For example, if a large number of high-performance information processing devices are prepared for such a computation, the encrypted data may be decrypted. Also, there is a possibility that an effective computation technique for decryption against the theory underlying the encryption may be found. If such a possibility exists even a bit, there occurs a problem with regard to highly confidential data. For example, if data such as a military secret is theft, such a decryption possibility may be used as an unduly bargaining chip in a negotiation even if the data has been encrypted.

As described above, small-size storage devices that are convenient to use and have been widely used, as well as related art examples using these storage devices are insufficient for security in several respects. Therefore, there is desired a storage device that has a strengthened security function without losing the advantage that it can easily be used anywhere.

As for technologies for destroying information stored in a storage device with the lapse of time, refer to the above-mentioned Patent Documents 1 and 2. With regard to a technology for fragmenting data to store it, refer to the above-mentioned Patent Document 3.

Accordingly, an object of this invention is to provide a system, an external storage device, a method, and a program product for solving the above-mentioned problems. This object is achieved by combinations of the features described in the independent ones of the appended claims. Further the dependent claims prescribe more advantageous examples of this invention.

Means for Solving the Problems

In order to solve the above-mentioned problems, according to an aspect of the present invention, there is provided a system including an information processing device and an external storage device for storing information received from the information processing device. The information processing device includes a first storage unit; a first generation unit for performing a conversion of target information to be stored in the external storage device using a secret sharing scheme in which predetermined reference number pieces of divided data is required to restore the target information, so as to generate multiple pieces of divided data whose number is larger than the reference number; an output unit for selecting first number pieces of divided data from among the generated multiple pieces of divided data, the first number being equal to or larger than the reference number, and outputting the selected first number pieces of divided data to the external storage device; and a first storage execution unit for storing second number pieces of divided data except for the outputted first piece of divided data among the generated multiple pieces of divided data, in the first storage unit. The external storage device includes a second storage unit; a second storage execution unit for storing each of the first number pieces of divided data inputted from the information processing device, in the second storage unit; and a data destruction unit for destroying pieces of divided data whose number is larger than a difference between the reference number and the first number and equal to or smaller than a sum of the difference and the second number, among the stored first number pieces of divided data if a predetermined reference time has elapsed since a time point of receipt of a predetermined operation. Also provided is a method for storing information acquired by the external storage device from the information processing device in this system. Further provided is a program product for causing the information processing device and the external storage device to function as in this system.

The outline of this invention described above does not include all features required for this invention and subcombinations of these features can also be included in this invention.

BEST MODE FOR CARRYING OUT THE INVENTION

Now this invention will be described through the preferred embodiments thereof (hereafter referred to as "embodiments"). However, the embodiments to be described below do not limit the invention according to the appended claims. Also, all combinations of the features described in the embodiments are not essential as the problem-solving means of the invention.

FIG. 1 shows the overall configuration of an information system 10. The information system 10 includes an information processing device 20, an external storage device 30, and caps 35-1 to 35-3. The information processing device 20 is a device such as a personal computer or a personal digital assistant (PDA). According to an operation performed by a user, the information processing device 20 processes information and performs a computation. The external storage device 30 is, for example, a USB memory device, a Compact Flash memory card ("Compact Flash" is a registered trademark), or an SD memory card and is provided so as to be attachable/detachable to/from the information processing device 20. It stores information received from the information processing device 20. The information system 10 according to this invention is intended to, even if data temporarily stored in the external storage device 30, such as confidential information, remains without being erased, destroy the data so that it is extremely difficult to restore the data to its original state after a certain period of time has elapsed. Further this destruction process is realized by a function of the external storage device 30 per se, so the risk of information leakage is reduced even if the external storage device 30 is lost or stolen and if no instruction is given from the outside or no power is supplied.

The caps 35-1 to 35-3 are each able to be put on the connection terminal of the external storage device 30 for connecting the external storage device 30 to the information processing device 20 if no such connection is made. The caps 35-1 to 35-3 are originally intended to protect the connection terminal. The caps 35-1 to 35-3 also serve to adjust the reference time for data destruction or the destruction rate. Specifically the caps 35-1 to 35-3 are of different types and designed so as to be distinguishable in type from the outside by differences in color. The external storage device 30 adjusts the data destruction reference time or destruction rate in accordance with which of the caps 35-1 to 35-3 is put on the connection terminal. The external storage device 30 may be further provided with a switch 32 that is operable from the outside. The external storage device 30 may adjust the data destruction reference time or destruction rate according to an operation that the switch 32 receives. Designing the external storage device 30 as described above allows the timing for data destruction to be changed flexibly according to the application.

Hereafter the specific configuration will be described.

FIG. 2 shows the functional configuration of the information processing device 20. The information processing device 20 includes a memory device 200, a communication I/F 210, a first generation unit 220, an output unit 230, a first storage execution unit 240, a registration unit 250, and a first restoration unit 260. The memory device 200 is realized by a random access memory (RAM) 1020 or a hard disk drive 1040 to be discussed later. It stores data generated according to an operation received from a user or stores data inputted from the outside. For example, the memory device 200 stores target information 208 that is a target to be stored in the external storage device 30. Also, the memory device 200 includes a first storage unit 205. The first storage unit 205 serves as a storage area for storing divided data to be discussed later. The communication I/F 210 is realized by a communication interface 1030 to be discussed later and communicates with an external server or the like.

The first generation unit 220, output unit 230, first storage execution 240 unit, registration unit 250, and first restoration unit 260 are each realized by a central processing unit (CPU) 1000 or the like to be discussed later that operates according to an instruction of an installed program. The first generation unit 220 reads from the memory device 200 the target information 208 that is a target to be stored in the external storage device 30. Then the first generation unit 220 performs a conversion of the target information 208 using a secret sharing scheme in which predetermined reference number K pieces of divided data is required to restore the target information 208 to its original state, wherein K is at least 2. Thus the first generation unit 220 generates multiple pieces of divided data that is larger in number than the reference number K. The number of the generated pieces of divided data is defined as N, wherein N is at least 3.

Here, the basic idea of the secret sharing scheme is, for example, to use the magnitude of the y intercept of a linear function as plain text and the coordinates of multiple points that the linear function are passing through, as data after conversion. If the number of the acquired sets of coordinates is not two or more, it is extremely difficult to identify the value of the original y intercept even if a single set of coordinates is acquired. As described above, the secret sharing scheme makes it difficult to make data acquired in a fragmentary fashion a clue as to how to illegally restore data, compared to the existing encryption technologies. Further the secret sharing scheme makes it difficult to restore even a part of plait text data illegally. Also, the secret sharing scheme has the features that the theory underlying conversion is extremely simple and that it is less conceivable to find a technology that easily estimates the y intercept against this theory.

The output unit 230 selects first number M pieces of divided data that is equal to or more than a reference number K from among the generated N pieces of divided data, and outputs the selected M pieces of divided data to the external storage device 30 so that the M pieces of divided data are stored in a second storage unit 300 to be discussed later. The first storage execution unit 240 stores second number pieces of divided data except for the outputted M pieces of divided data among the generated N pieces of divided data, to the first storage unit 205. The second number is defined as L. The divided data to be stored in the first storage unit 205 may be all pieces of divided data remaining after having output the M pieces of data from among the generated pieces of divided data (that is, L=N−M), or may be some of the remaining pieces of divided data (that is, L<N−M). Thus, K<M<N, L>1, and L<N−M. In addition to the above-mentioned processes if L<N−M, the registration unit 250 may register P pieces of divided data except for the outputted M pieces of divided data and the stored L pieces of divided data among the generated N pieces of divided data, with an external server. Such an external server is preferably administered by a highly reliable organization such as a government body, an intergovernmental organization, or a local authority, or by a corporation or other entities that have high technological capabilities and with which the information system is able to stably communicate.

The divided data to be registered may be all the remaining pieces except for the M pieces of divided data and the L pieces of divided data (that is, P=N−M−L), or some of the remaining pieces of divided data (that is, P<N−M−L). Thus, P<N−M−L. To make such registration, the first generation unit 220 must generate N pieces of divided data that is larger in number than the first number M by two or more (i.e., P>1 and M<N−2). The first restoration unit 260 reads from the external storage device 30 pieces of divided data yet to be destroyed by the data destruction unit 340, among the pieces of divided data that are stored in the second storage unit 300 of the external storage device 30. Then the first restoration unit 260 restores the read pieces of divided data to the target data 208 on the basis of the divided data read from the first storage unit 205. If the registration unit 250 has registered pieces of divided data with an external server, the first restoration unit 260 may restore the divided data to the target information 208 also on the basis of the registered pieces of divided data.

FIG. 3 shows the functional configuration of the external storage device 30. The external storage device 30 includes the second storage unit 300, a second generation unit 320, an acquisition unit 310, a second storage execution unit 330, the data destruction unit 340, a setup unit 350, a setup control unit 360, and a second restoration unit 390. Besides the information processing device 20 described with reference to FIG. 2, the external storage device 30 is also able to be connected to an information processing device that has no function concerning data division. Hereinafter, both cases will collectively be described. The second storage unit 300 is provided to store the target information 208 received from the information processing device 20. If the external storage device 30 is connected to the information processing device 20, the second generation unit 310 acquires the multiple pieces of divided data generated by performing the conversion of the target information 208, from the information processing device 20. The number of the pieces of divided data is M.

On the other hand, if the external storage device 30 is connected to another information processing device, it acquires the target information 208 in its state before conversion. In this case, the second generation unit 310 performs a conversion of the target information 208 on the basis of a secret sharing scheme in which the reference K pieces of divided data are required to restore the target information 208, in order to generate the first number pieces of divided data whose number is multiple and equal to or larger than the reference number K. The first number is defined as M. If the target information 208 is large in size, the second generation unit 310 may previously divide data representing the target information 208 into multiple parts and then further divide each part into M pieces of divided data. Hereinafter, the case in which the M pieces of divided data are acquired from the information processing device 20 and the case in which the M pieces of divided data are generated in the external storage device 30 will collectively be described. First, if the target information 208 is subjected to a conversion by the second generation unit 310, the acquisition unit 320 acquires the divided data subjected to the conversion from the second generation unit 310. If such a conversion is not performed by the second generation unit 310, the acquisition unit 320 acquires the divided data outputted from the external information processing device 20, from the second generation unit 310.

In each case, the second storage execution unit 330 stores the acquired M pieces of divided data in the second storage unit 300. The M pieces of data are preferably stored so as to be associated with one another in preparation for subsequent reads. For example, if the second storage unit 300 is previously divided into M regions, the second storage execution unit 330 stores each of the acquired M pieces of divided data in each of the M regions. For example, if M=2, the second storage unit 300 may previously be divided into two regions and the second storage execution unit 330 may store each of pieces of divided data generated by performing a conversion of identical target information, in each of the two regions. The pieces of divided data may be assigned an identical file name or file names whose association is recognizable. For example, the second storage execution unit 330 may assign file names each including a common character string to mutually associated pieces of divided data and store these files. For example, using the file name (e.g., XXX.txt) of data representing target information, the second storage execution unit 330 may assign a file name XXX.txt01 to a piece of divided data and a file name XXX.txt02 to another piece of divided data.

If preset reference time has elapsed since the time point of receipt of a predetermined operation, the data destruction unit 340 destroys pieces of data whose number D is larger than the difference between the reference number K and the first number M, among the stored M pieces of divided data. Thus, D>M−K. "Destroy" refers to change a bit randomly selected from among bits included in data. Such a change may be made to as few as one bit. However, for example, if the divided data is encoded using an error correcting code, bits whose number exceeds the correction limit must be changed.

In order to perform restoration on the basis of the divided data stored in the memory device 200, the number of pieces of divided data to be destroyed must be equal to or smaller than the sum of the difference between the reference number K and the first number M and the second number L. Thus, M−K≤D≤M−K+L. Further, in order to perform restoration on the basis of the divided data stored in the memory device 200 as well as the divided data registered in an external server, the number of pieces of divided data to be destroyed must be equal to or smaller than the sum of the difference between the reference number K and the first number M, the second number L, and the third number P. Thus, M−K≤D≤M−K+L+P. As another operation example thereof, the data destruction unit 340 may gradually change the divided data with the lapse of time.

The setup unit 350 sets up the reference time serving as a condition for changing the divided data, for the data destruction unit 340. For example, the setup unit 350 may change the reference time on the basis of an operation that the switch 32 receives from a user or the like. The setup unit 350 may also change the reference time according to an instruction from the setup control unit 360 to be discussed later. As another example, the setup unit 350 may change the rate at which the data is destroyed and set up the changed rate for the data destruction unit 340. "Rate" refers to, for example, the number of bits to be changed per unit time. This allows more previously stored pieces of data to become more difficult to restore to their original states.

The setup control unit 360 performs control for determining the above-mentioned reference time to be set up by the setup unit 350. Specifically, the setup unit 360 includes a measurement unit 365, a cap determination unit 370, a keyword search unit 375, and a connection count unit 380. The measurement unit 365 measures the frequency at which the external storage device 30 is connected to external information processing devices such as the information processing device 20. "Frequency" refers to, for example, the number of times per unit time, such as the number of times per week or that per month. "Connection" may be an electrical communication process or a physical connection of the connection terminal of the external storage device 30 to information processing devices. The measurement unit 365 notifies the setup unit 350 of the measured frequency. Upon receiving the frequency, if the measured frequency is higher then a specified threshold frequency, the setup unit 350 sets up a shorter reference time than in a case in which a lower frequency than the specified threshold frequency is measured. This allows prediction of the time period in which the data should be stored on the basis of the histories up to then. Thus the data will automatically be destroyed upon elapsing of the time period.

The cap determination unit 370 determines which of multiple types of caps, for example, which of caps 35-1 to 35-3 is put on the external storage device. The type is determined, for example, in the following manner: the connecting part of the cap to the external storage device 30 is formed into a shape such that the type of the cap is distinguished; and the cap determination unit 370 determines the type of the cap on the basis of the shape. A notification of the determination result is provided to the setup unit 350. Upon receipt of the determination result, the setup unit 350 sets up a time period having a predetermined length as the reference time according to the type of the put cap. This allows a user to change the cap to another depending to the purpose. For example, assume that one month, three months, and six months are preset to the caps 35-1, 35-2, and 35-3, respectively. A user is able to flexibly set up a time period until the data is destroyed, by selectively using the caps according to the applications.

The keyword search unit 375 searches for a file including a predetermined keyword among files stored in the second storage unit 300 as the M pieces of divided data. A keyword serving as a key for a search is preferably one indicating that data in the file is highly confidential data. Specifically, such keywords include "PASSWORD," "CONFIDENTIAL," and "IMPORTANT." A notification of the search result is provided to the setup unit 350. Upon receipt of the search result, if such a file has been retrieved, the setup unit 350 sets up a shorter reference time than in a case in which such a file is not retrieved.

The connection count unit 380 counts the number of times the external storage device 30 has been connected to other information processing devices since the completion of the last connection of the external storage device 30 to a predetermined information processing device. This predetermined information processing device refers to, for example, an information processing device administered by the user of the external storage device 30, and is the information processing device 20 in this embodiment. Other information processing devices refer to, for example, information processing devices administered by others. As described above, the connection count unit 380 counts the number of times the external storage device 30 has been connected to other information processing devices using the time point of the last connection of the external storage device 30 to the user's information processing device as the starting point. A notification of the count result is provided to the setup unit 350. Upon receipt of the counting result, if the counted number of connections is larger, the setup unit 350 sets up a shorter reference time than in a case in which the counted number of connections is smaller. Thus, if the external storage device 30 is frequently connected to others' information processing devices rather than connected to the user's information processing device, it is considered that such usage is not so common and that it is highly likely that a certain illegal act has been conducted. This allows the data to be destroyed quickly.

The second restoration unit 390 reads the multiple pieces of divided data from the second storage unit 300, restores the read multiple pieces of divided data to the target information, and outputs the restored target information to the external information processing device 20. For example, the second restoration unit 390 may automatically perform this restoration process if the connection terminal of the external storage device 30 has been inserted into the information processing device 20. As a specific example, if the second storage unit 300 is previously divided into the M number of regions, the second restoration unit 390 reads a file having an identical file name or an associated file name from each region and performs the restoration process in the secret sharing scheme using the read files as pieces of divided data.

The restoration process in the secret sharing scheme refers to a process in which multiple pieces of divided data are inputted into a program including an algorithm for restoration. Therefore it is not certain whether or not the target information has been restored properly. As a result, after the target information, about which the success or failure of the restoration is not certain, has been outputted to the information processing device 20, the user of the information processing device 20 may consider that the restoration has failed and instruct the external storage device 30 to restore the target information on the basis of the divided data stored in the first storage unit 205. In such a case, the second restoration unit 390 may read the pieces of divided data that are stored in the second storage unit 300 and yet to be destroyed by the data destruction unit 340 and then restore the read pieces of divided data to the target information on the basis of the pieces of divided data read from the first storage unit 205 of the information processing device 20. As described above, the pieces of divided data stored in the first storage unit 205 may be restored not only in the information processing device 20 but also in the external storage device 30.

FIG. 4 shows the flowchart of processes in which the target information is stored in the external storage device 30 by the information processing device 20. The first generation unit 220 divides the target information into N pieces of divided data which includes performing a conversion of the target information 208, which is a target to be stored in the external storage device 30, using a secret sharing scheme and encoding using an error correcting code (step S400). Specifically the first generation unit 229 first performs a conversion using a secret sharing scheme in which a predetermined reference number K pieces of divided data is required to restore the target information 208, so as to generate multiple pieces of intermediate data whose number is larger than the reference number K. Then the first generation unit 220 encodes each of the generated pieces of intermediate data using an error correcting code so as to generate multiple pieces of divided data. The number of the pieces of divided data is also N. As the error correcting code, for example, a Bose-Chaudhuri-Hocquenghem (BCH) code may be used.

The output unit 230 selects the first number M pieces of divided data whose number is equal to or more than the reference number K from among the generated N pieces of divided data, and outputs the selected M pieces of divided data to the external storage device 30 so that the M pieces of divided data are stored in the second storage unit 300 to be discussed later (step S410). The first storage execution unit 240 stores the second number L pieces of divided data except for the outputted M pieces of divided data among the generated N pieces of divided data, in the first storage unit 205 (step S420). The L pieces of divided data to be stored may be all pieces of divided data remaining after having output the M pieces of divided data from among the generated pieces of divided data (that is, L=N−M), or may be some of the remaining pieces of divided data (that is, L<N−M).

In addition to the above-mentioned processes, the registration unit 250 may register the P pieces of divided data except for the outputted M pieces of divided data and the stored L pieces of divided data among the generated N number of divided data, with an external server (step S430). The P pieces of divided data to be registered may be all the remaining pieces except for the M pieces of divided data and the L pieces of divided data (that is, P=N−M−L), or some of the remaining pieces of divided data (that is, P<N−M−L).

FIG. 5 schematically shows the places in which the pieces of divided data are stored. The target information is divided into a total of N pieces of divided data. Among these, the M pieces of divided data are stored in the second storage unit 300 of the external storage device 30. Among the remaining pieces of divided data, the L pieces of divided data are stored in the first storage unit 205. Further, among the remaining pieces of divided data, the P pieces of divided data are registered with an external server by the registration unit 250. The number of the D pieces of divided data to be destroyed by the data destruction unit 340 is larger than the difference between the first number M and the reference number K and equal to or smaller than the sum of the difference, second number L, and third number P.

FIG. 6 shows the flowchart of processes in which the pieces of divided data stored in the external storage device 30 are restored to the target information by the information processing device 20. The information processing device 20 performs the following processes, for example, upon insertion of the external storage device 30 into the information processing device 20. That is, the first restoration unit 260 reads the pieces of divided data that are stored in the second storage unit 300 of the external storage device 30 and yet to be destroyed by the data destruction unit 340 thereof (S600). The number of the read pieces of divided data is formally M; however, some of the read pieces may have been destroyed. Thus the number of pieces of divided data yet to be destroyed among the read pieces of divided data is defined as M' number, which may be different from the M number. Thus M'<M.

The first restoration unit 260 restores the read pieces of divided data to the target information 208 (S610). Specifically the first restoration unit 260 decodes each of the read M' pieces of divided data using the error correcting code so as to generate M' pieces of intermediate data. Then the first restoration unit 260 attempts to restore the target information 208 using the secret sharing scheme on the basis of the generated M' pieces of intermediate data. If M' is equal to or larger than the reference number K, it is considered the restoration has succeeded. If M' is less than the reference number K, it is considered the restoration has not succeeded. Note that it is unknown to which of the M pieces of divided data the read yet-to-be-destroyed M' pieces of divided data each correspond at this point. Therefore, the first restoration unit 260 may restore some types of target information by using some combinations of pieces of divided data that can be assumed to be yet-to-be-destroyed data.

If the restoration has succeeded (S620: YES), the first restoration unit 260 ends the processes shown in this flowchart. On the other hand, if the restoration has not succeeded (S620: NO), the first restoration unit 260 reads the L pieces of divided data from the first storage unit 205 as well as acquires the P pieces of divided data registered with the external server (S630). Whether or not the restoration has succeeded may be determined on the basis of whether or not an input indicating that the restoration has failed has been received from a user as follows. That is, the user attempts to use the target information restored in S610. If the target information has not been restored properly, the user notifies the information processing device 20 that the restoration has failed. Upon receipt of the notification, the first restoration unit 260 performs the process in step S630. Specifically, in step S640, the first restoration unit 260 restores the M' pieces of divided data to the target information 208 on the basis of each of the L+P pieces of divided data.

FIG. 7 shows the flowchart of processes in which the external storage device 30 stores the pieces of divided data and destroys the stored pieces of divided data. The external storage device 30 performs the following processes, for example, periodically or each time the external storage device 30 acquires data from the outside. That is, the second generation unit 310 acquires the target information 208 from the outside and performs a conversion of the target information 208 using a secret sharing scheme in which the reference number K pieces of divided data are required to restore the target information 208, so as to generate the first number pieces of divided data whose number is multiple and equal to or larger than the reference number K (S700).

Specifically the second generation unit 310 performs a conversion of the target information using the secret sharing scheme so as to generate multiple pieces of intermediate data, and encodes each of the generated pieces of intermediate data using an error correcting code so as to generate multiple pieces of divided data. Note that if the pieces of divided data already subjected to a conversion rather than the target information 208 yet to be subjected to a conversion are acquired, the process in step S700 is unnecessary. The acquisition unit 320 acquires from the second generation unit 310 the multiple pieces of divided data outputted from the information processing device 20 or the multiple pieces of divided data generated in the second generation unit 310 by performing a conversion of the target information 208 (S710). The number of the acquired pieces of divided data is M. In both cases, the second storage execution unit 330 stores the acquired pieces of divided data in the second storage unit 300 (S720).

If the target information 208 or divided data is not inputted into the second generation unit 310, the second generation unit 310 may perform a process of notifying the information processing device 20 of the remaining capacity of the second storage unit 300, instead of the above-described process. While the second generation unit 310 may notify of the second storage unit 300's remaining capacity as it is, it preferably notifies of the size of data before a conversion that can be stored after subjected to a conversion using a secret sharing scheme. For example, assume that the remaining capacity is X megabytes and that the rate of increase of the data using a secret sharing scheme and an error correcting code is 150% (that is, an increase by 2.5 times). The second generation unit 310 notifies the information processing device 20 of X divided by 2.5, that is, X/2.5 megabytes as the remaining capacity. This allows the information processing device 20 to properly recognize the capacity in which additional data can be stored, without having to take into account a change in data size due to the secret sharing scheme.

Next, the data destruction unit 340 determines whether or not a predetermined operation has been performed (S730). A "predetermined operation" means, for example, the insertion/removal of the external storage device 30 into/from the information processing device 20. Both the insertion and removal of the external storage device 30 may be predetermined operations, or only the removal of the external storage device 30 from the information processing device 20 may be a predetermined operation and its insertion may not be a predetermined operation. As another example, the data destruction unit 340 may determine a predetermined operation of the switch provided on the external storage device 30 as a predetermined operation or may determine an access of the information processing device 20 to the external storage device 30 as a predetermined operation. Such determination may be made independently of the processes from S700 to S720.

If a predetermined operation has been performed (S730: YES), the data destruction unit 340 starts the timer to measure the time until predetermined reference time for data destruction has elapsed (S740). Thereafter, the data destruction unit 340 determines whether or not the reference time has elapsed since the performance of the predetermined operation (S750). If the reference time has elapsed (S750: YES), the data destruction unit 340 destroys pieces of divided data whose number is larger than the difference between the reference number K and the first number M and equal to or smaller than the sum of the difference, second number L, and third number P (S760), among the M pieces of divided data stored in the second storage unit 300 (S760). Such destruction is made, for example, by randomly selecting bits whose number is larger than the correction limit of the error correcting code and then inverting the values of these bits.

Alternatively, the data destruction unit 340 may gradually destroy the divided data so that the number of the error bits exceeds the correction limit if the reference time has elapsed. Specifically, for example, the data destruction unit 340 may change the logical value of a bit randomly selected from among multiple bits included in a piece of divided data to be destroyed each time an interval that is substantially shorter than the reference time has elapsed. According to this process, more previously stored data has the larger number of error bits. This makes it difficult to illegally restore the target information. Further, increases in the number of error bits with the lapse of time make it difficult for an illegal user to make an analysis on how many bits have errors when the illegal user attempts to restore the target information.

According to the information system 10 described above with reference to FIGS. 1 to 7, the following excellent advantages are provided. First, using the secret sharing scheme rather than the existing encryption technologies to perform a conversion of the target information makes it difficult to restore the data once destroyed to even a part of the original data. Also, it is made difficult to use the destroyed data as a clue to illegally restoring other data. Further, the theory underlying the secret sharing scheme is extremely simple compared to those of the existing encryption technologies, and the risk that a future study will enable data to be restored illegally is extremely low. Furthermore, since the conversion using the secret sharing scheme is an independent process, data confidentiality is further enhanced by combining the secret sharing scheme and any existing encryption technology.

Changing some of pieces of data encoded using an error correcting code to destroy pieces of data allows a reduction in the throughput required to destroy the pieces of data. In other words, if pieces of data yet to be encoded are stored in the external storage device 30 as they are, most of the pieces of data must be changed so that even some of the pieces of data is not read illegally. On other hand, if pieces of data encoded using an error correcting code are changed, it is difficult to illegally restore even some of pieces of data yet to be subjected to a conversion if the number of bits to be changed exceeds the correction limit even if only slightly. Combining the secret sharing scheme and encoding using an error correcting code as described above allows the number of bits required for data destruction to be extremely reduced.

Reductions in the number of bits to be changed provide the following ramifications. First, the throughput required for bit change is reduced. The external storage device 30 according to this embodiment destroys stored pieces of data using its own function. The external storage device 30 operates with the lapse of time even if it is not connected to the information processing device 20. For this reason, the external storage device 30 cannot operate only on an external power supply and must include a battery or the like to operate independently. Since a flash memory that is included in the external storage device 30 and serves as the second storage unit 300 requires power depending on the size of data to be changed, reductions in the number of bits to be changed leads to a substantial reduction in battery consumption. For example, according to a trial calculation made by the inventors with a general-purpose battery used as a power supply, complete erasure of all data can be performed only four times. On the other hand, if a few bits of data encoded using an error correcting code are changed every three hours, the battery is able to last for 200 years. Further, since the number of data rewrites of the flash memory reaches a predetermined number of times, the flash memory comes to the end of its life and becomes unavailable. Therefore, reductions in the bit number allow the life of the external storage device 30 to be made longer.

The following advantages are provided by restoring pieces of data whose part has been destroyed in the external storage device 30, in the information processing device 20. First, as the importance of security measures increases in recent years, data having high confidentiality must sometimes be stored in a centrally controlled server rather than in a terminal device such as the information processing device 20. In response to such a situation, thin clients and the like having nearly no local storage area have also been used. At such a request, the information processing device 20 may not be able to continuously store data having high confidentiality even if it can temporarily store the data. Even in such a case, use of the external storage device 30 according to this embodiment allows the information processing device 20 to store divided data that cannot solely be restored to the target information, without having to store highly confidential data in the information processing device 20. Thus the information processing device 20 is able to freely restore pieces of data destroyed in the external storage device 30 as necessary. Further, storing some of pieces of divided data in an external server makes it unnecessary to store even some of pieces of divided data in the information processing device 20 per se. Furthermore the user is able to freely restore data as necessary by accessing the server from a remote location even if pieces of the data have been destroyed in the external storage device 30.

FIG. 8 shows the flowchart of processes in which the reference time is set up by the external storage device 30. The measurement unit 365 measures the frequency at which the external storage device 30 is connected to external information processing devices such as the information processing device 20 (S800). Then the measurement unit 365 notifies the setup unit 350 of the measured frequency. Upon receipt of the measured frequency, if the measured frequency is higher than the specified threshold frequency, the setup unit 350 sets up a shorter reference time than in a case in which the measured frequency is lower than the specified threshold frequency (S810). Thus the external storage device 30 estimates the time period in which data should be stored on the basis of the histories up to then and automatically destroys pieces of data upon elapsing of the time period.

The cap determination unit 370 determines which of multiple types of caps, for example, which of the caps 35-1 to 35-3 is put on the external storage device (S820). A notification of the determination result is provided to the setup unit 350. Upon receipt of the determination result, the setup unit 350 sets up a time period having a predetermined length as the reference time according to the type of the put cap (S830). Thus the user is able to flexibly set up a time period in which data should be stored, by changing the cap to another depending on the purpose.

The keyword search unit 375 searches for a file including a predetermined keyword among files stored in the second storage unit 300 as divided data (S840). A keyword serving as a key to a search is preferably one indicating that data in the file is highly confidential. A notification of the search result is provided to the setup unit 350. Upon receipt of the search result, if such a file has been retrieved, the setup unit 350 sets up a shorter reference time than in a case in which no such file is retrieved (S850).

The connection count unit 380 counts the number of times the external storage device 30 has been connected to other information processing devices since the completion of the last connection of the external storage device 30 to a predetermined information processing device (S860). This predetermined information processing device refers to, for example, an information processing device administered by the user of the external storage device 30 and is the information processing device 20 in this embodiment. Other information processing devices refer to, for example, information processing devices administered by others. As described above, the connection count unit 380 counts the number of times the external storage device 30 has been connected to other information processing devices using the time point of the last connection of the external storage device 30 to the user's information processing device as the starting point. A notification of the counting result is provided to the setup unit 350.

Upon receipt of the counting result, if the counted number of connections is larger, the setup unit 350 sets up a shorter reference time than in a case in which the counted number of connections is smaller (S870). Further, if the switch 32 receives a predetermined operation (S880), the setup unit 350 sets up the reference time according to the type of the operation (S890). The setup unit 350 may also set up the reference time according to a signal inputted from the information processing device 20 to set up the reference time instead of the type of such a physical operation.

FIG. 9 shows the flowchart of processes in which the target information is restored by the external storage device 30 on the basis of the stored divided data. The external storage device 30 performs the following processes, for example, if it is inserted into the information processing device 20. The second restoration unit 390 reads multiple pieces of divided data from the second storage unit 300 (S900). Then the second restoration unit 390 restores the read pieces of divided data to the target information using the secret sharing scheme, and outputs the target information to the external information processing device (S910).

Next, the second restoration unit 390 determines whether or not this restoration process had succeeded (S920). For example, if an instruction indicating that restoration of the target information should be attempted using the pieces of divided data stored in the information processing device 20 is additionally received, the second restoration unit 390 determines that the restoration process has failed. If the restoration process has failed (S920: NO), the second restoration unit 390 acquires from the information processing device 20 the pieces of divided data (L number) stored in the first storage unit 205 of the information processing device 20 and the pieces of divided data (P number) registered with an external server by the information processing device 20 (S930). Then the second restoration unit 390 restores the pieces of divided data that are stored in the second storage unit 300 and yet to be destroyed by the data destruction unit 340, to the target information on the basis of the acquired pieces of divided data and outputs the target information to the information processing device 20 (S940).

FIG. 10 shows an example of the hardware configuration of the information processing device 20. The information processing device 20 includes a CPU peripheral unit, an input/output unit, and a legacy input/output unit. The CPU peripheral unit includes a CPU 1000, a RAM 1020, and a graphic controller 1075, all of which are mutually connected via a host controller 1082. The input/output unit includes a communication interface 1030, a hard disk drive 1040, and a compact disc-read-only memory (CD-ROM) drive 1060, all of which are connected to the host controller 1082 via an input/output controller 1084. The legacy input/output unit includes a ROM 1010, a flexible disk drive 1050, and an input/output chip 1070, all of which are connected to the input/output controller 1084.

The host controller 1082 connects between the RAM 1020, and the CPU 1000 that accesses the RAM 1020 at a high transfer rate and the graphic controller 1075. The CPU 1000 operates on the basis of programs stored in the ROM 1010 and RAM 1020 and controls each component. The graphic controller 1075 acquires image data generated on a frame buffer provided in the RAM 1020 by the CPU 1000 or the like to display the image data on a display 1080. Alternatively, the graphic controller 1075 may include a frame buffer for storing image data generated by the CPU 1000 or the like.

The input/output controller 1084 connects between the host controller 1082, and the communication interface 1030 serving as an input/output device having a relatively high rate, a USB interface 1035, the hard disk drive 1040, and the CD-ROM drive 1060. The communication interface 1030 communicates with an external device via a network. The USB interface 1035 is connected to an external device such as the external storage device 30. The hard disk drive 1040 stores a program and data to be used by the information processing device 20. The CD-ROM drive 1060 reads a program or data from the CD-ROM 1095 and provides the read program or data to the RAM 1020 or hard disk drive 1040.

Also connected to the input/output controller 1084 are the ROM 1010 and input/output devices having a relatively low rate, such as the flexible disk drive 1050 and the input/output chip 1070. The ROM 1010 stores a boot program to be executed by the CPU 1000 at a boot of the information processing device 20 or a program or the like that is dependent on the hardware of the information processing device 20. The flexible disk drive 1050 reads a program or data from the flexible disk 1090 and provides the read program or data to the RAM 1020 or hard disk drive 1040 via the input/output chip 1070. Connected to the input/output chip 1070 are the flexible disk drive 1050, and various types of input/output devices via, for example, a parallel port, a serial port, a keyboard port, or a mouse port.

A program comprising computer readable program code to be provided to the information processing device 20 by the user is stored in a computer readable recording medium (i.e., a computer readable storage medium) such as the flexible disk 1090, the CD-ROM 1095, or an integrated circuit (IC) card. The program is read from a recording medium via the input/output chip 1070 and/or input/output controller 1084 and installed to the information processing device 20 so as to be executed. A program product comprises the recording medium having the program (i.e., computer readable program code) stored therein. The operations that the program causes the information processing device 20 and/or the external storage device 30 to execute, via a processor in the apparatus of the device 20 and/or 30 (e.g., the processor of CPU 1000 in device 20), are identical to those in the information processing device 20 and/or the external storage device 30 described in FIGS. 1 to 9. Therefore, description on the operations will be omitted.

The program described above may be stored in an external storage medium. Besides the flexible disk 1090 and CD-ROM 1095, such recording media includes optical recording media such as a digital versatile disc (DVD) and a phase change rewritable disk (PD), magneto-optical recording media such as a MiniDisc (MD) (trademark), tape media, and semiconductor memories such as IC cards. Further, a recording medium such as a hard disk or a RAM provided in a server system connected to a dedicated network or the Internet may be used as a recording medium so that such a recording medium provides a program to the information processing device 20 via such a network.

Furthermore, the program described above may be provided to a device such as the external storage device 30 via an input/output interface such as the USB interface 1035. Executing the inputted program by means of the CPU or the like causes the external storage device 30 to perform various functions of the external storage device 30 described with reference to FIGS. 1 to 9. Alternatively, a program may previously be stored in a ROM provided in the external storage device 30 so that and the external storage device 30 operates on the basis of the program. Also, the functions of the external storage device 30 may be performed by logic circuits rather than by software. For example, these functions may be performed by a circuit for performing a conversion of data using a secret sharing scheme and storing the data, a circuit for reading the data and restoring the data using the secret sharing scheme, a circuit for destroying the data, and a battery for driving these circuits. If the external storage device 30 is connected to the information processing device 20, this battery may be charged by the power supply of the information processing device 20.

While the present invention has heretofore been described using the embodiments, the technical scope of the invention is not limited to the scope described in the above-mentioned embodiments. It is apparent for those skilled in the art that various changes and modifications can be made to these embodiments. It is apparent from the description of the appended claims that embodiments in which such changes or modifications are made may also be included in the technical scope of the invention.

REFERENCE NUMERALS

Figure 1:
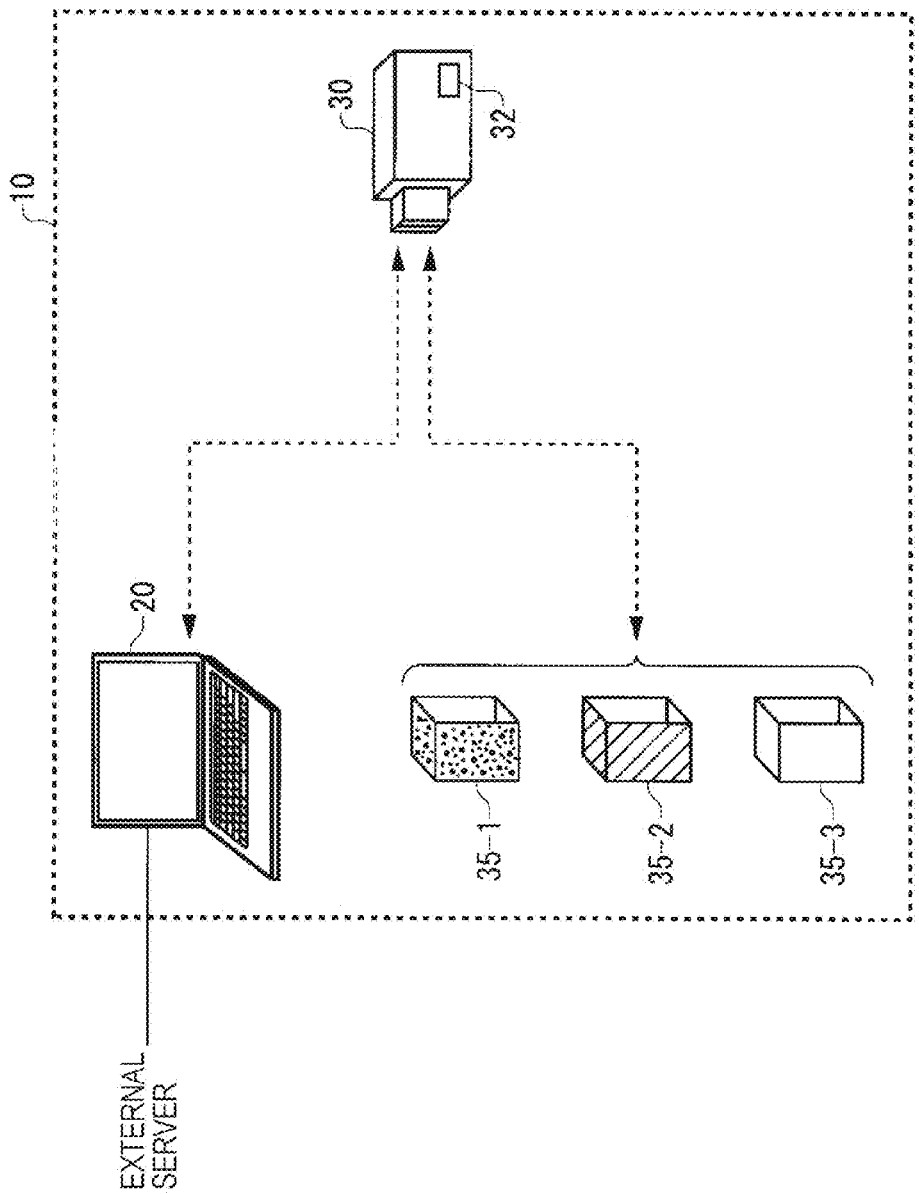
FIG. 1 is the overall configuration of an information system 10.
Figure 2:
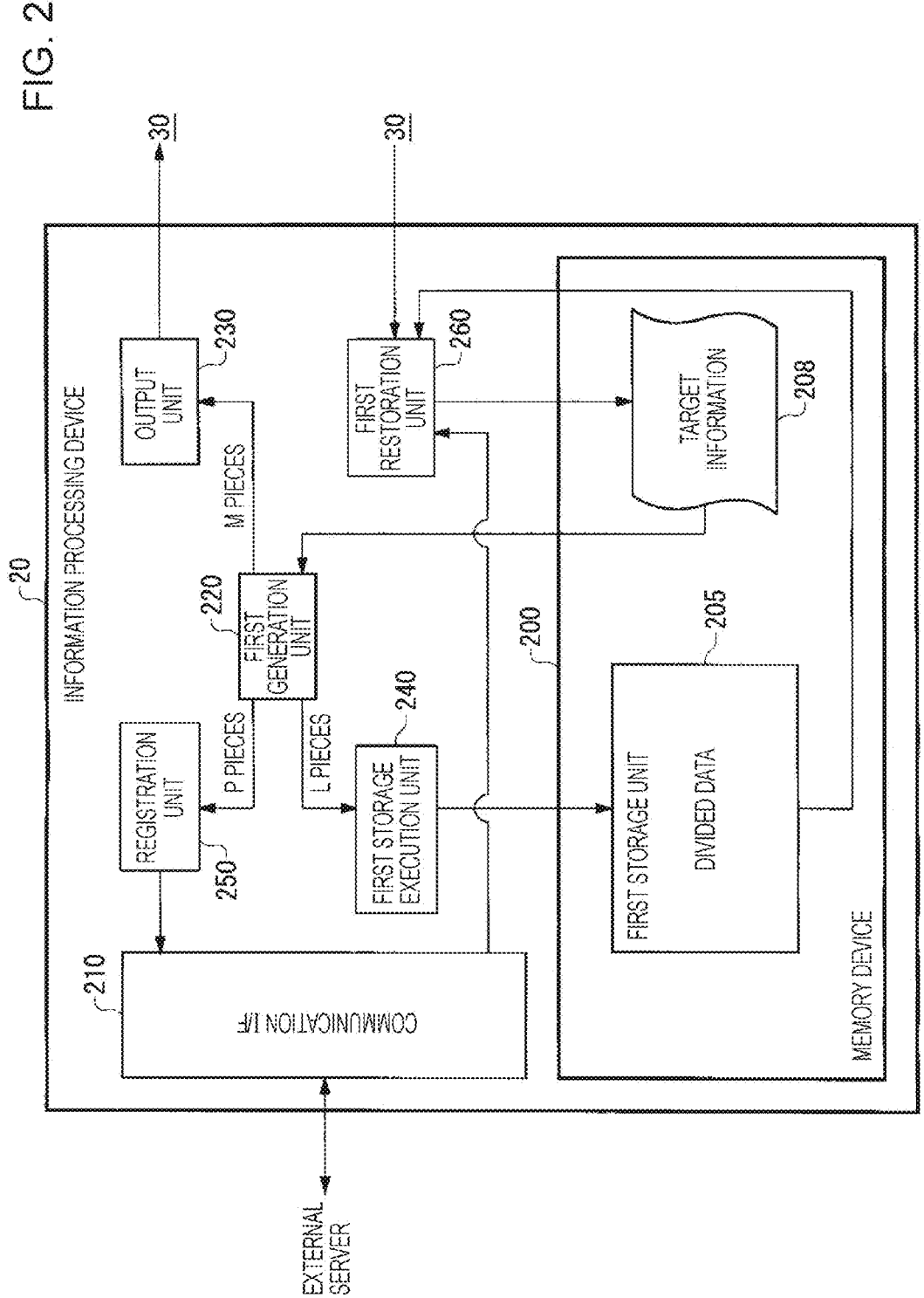
FIG. 2 is the functional configuration of an information processing device 20.
Figure 3:
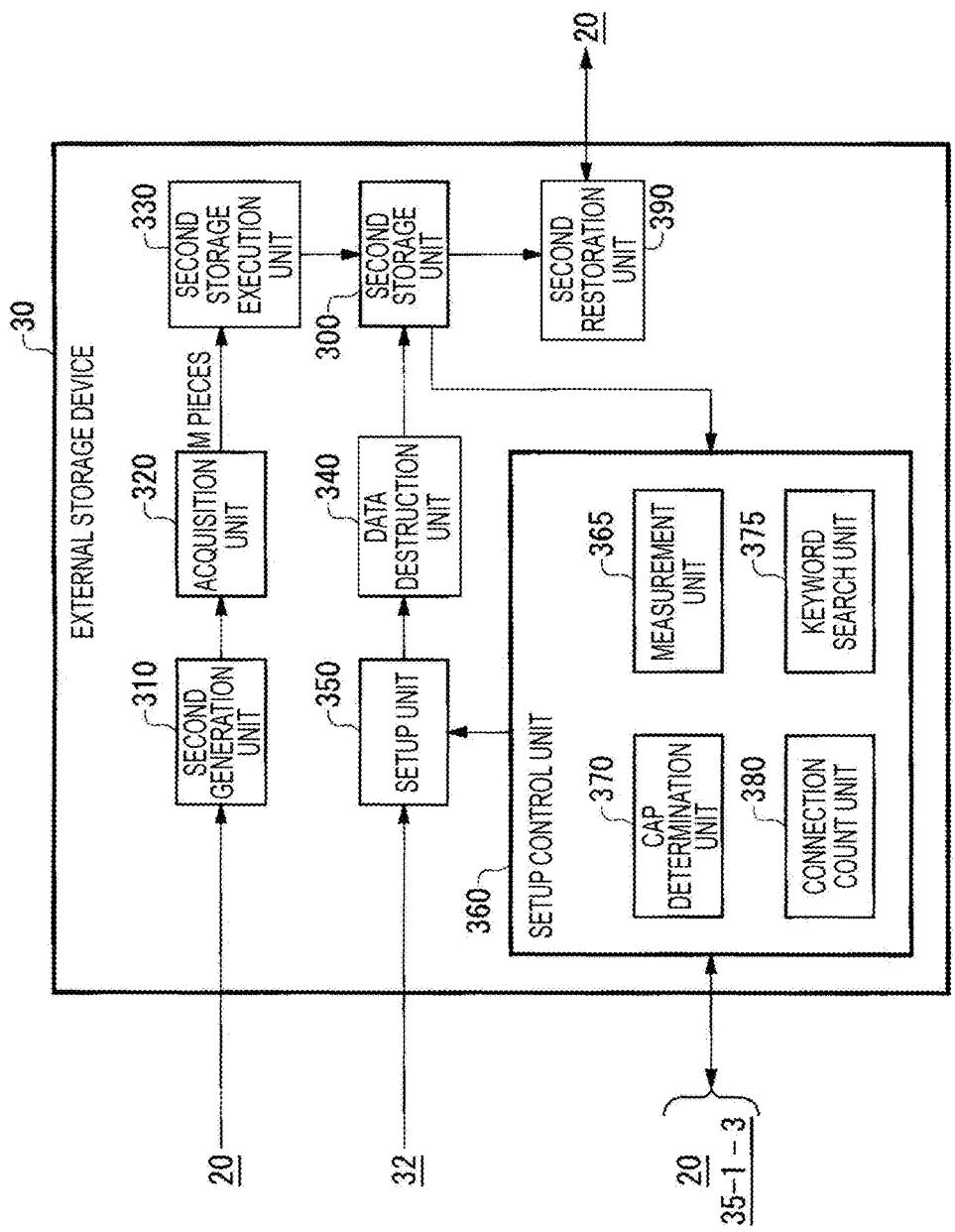
FIG. 3 is the functional configuration of an external storage device 30
Figure 4:
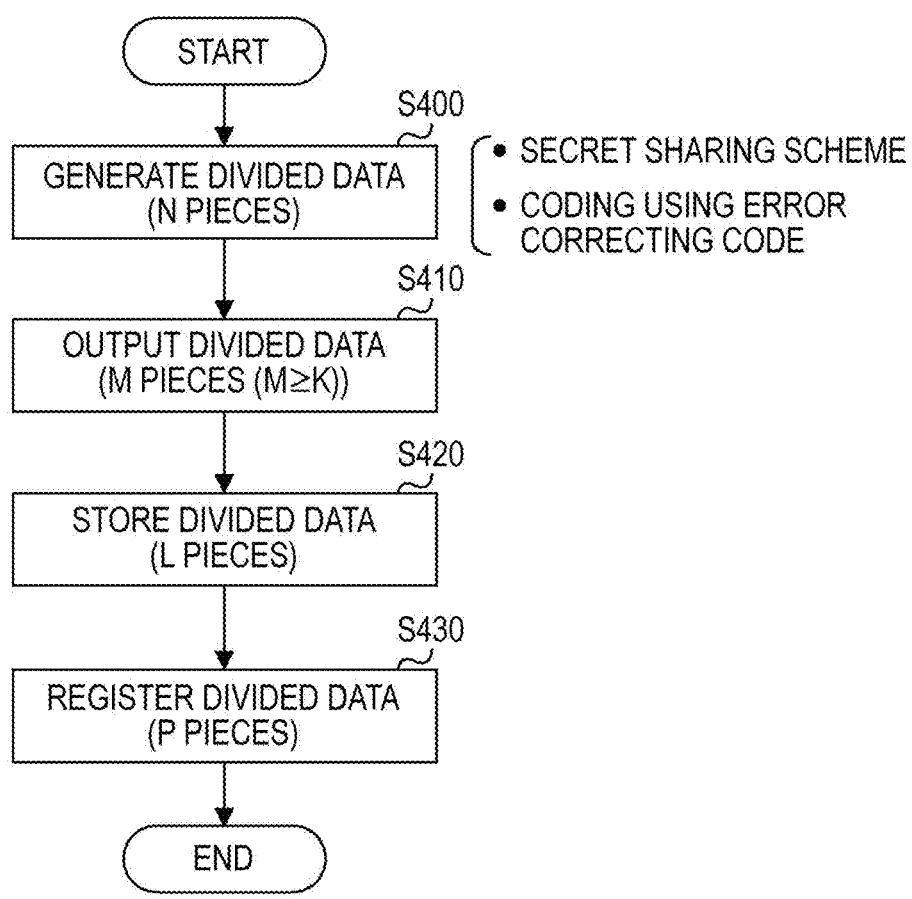
FIG. 4 is the flowchart of processes in which target information is stored in the external storage device 30 by the information processing device 20.
Figure 5:
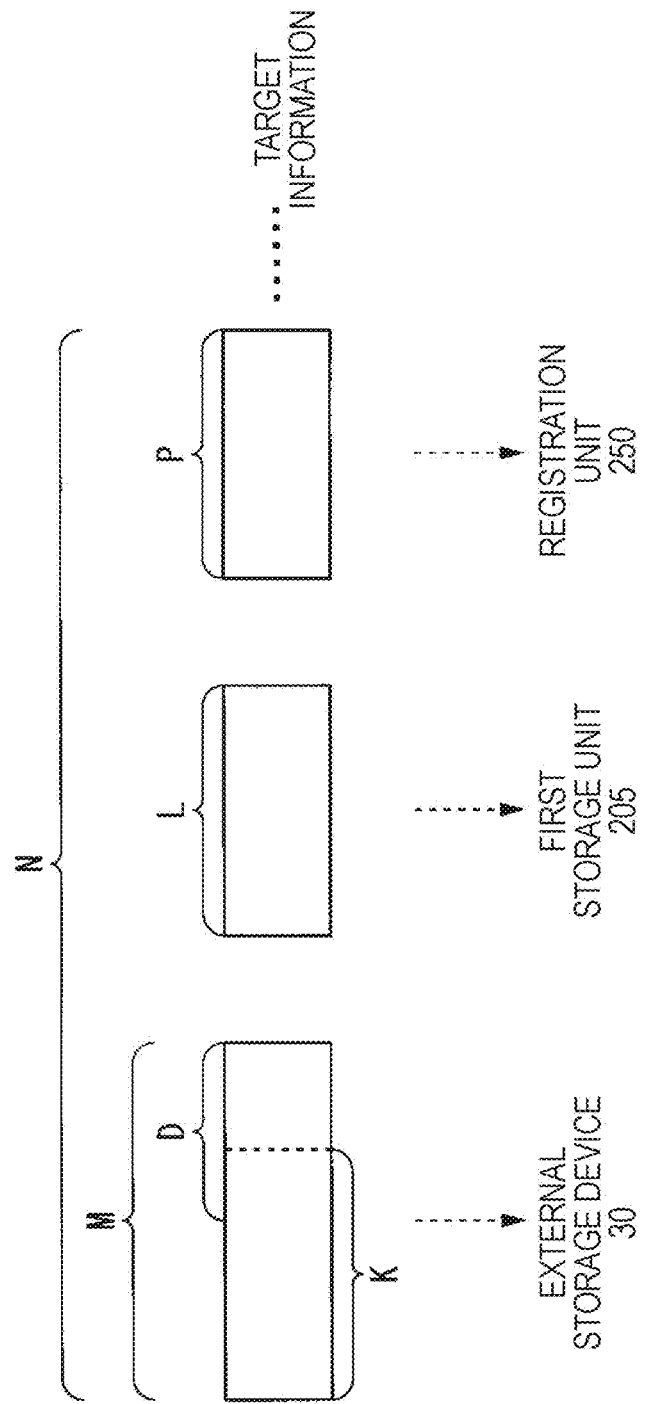
FIG. 5 schematically shows places for storing pieces of divided data.
Figure 6:
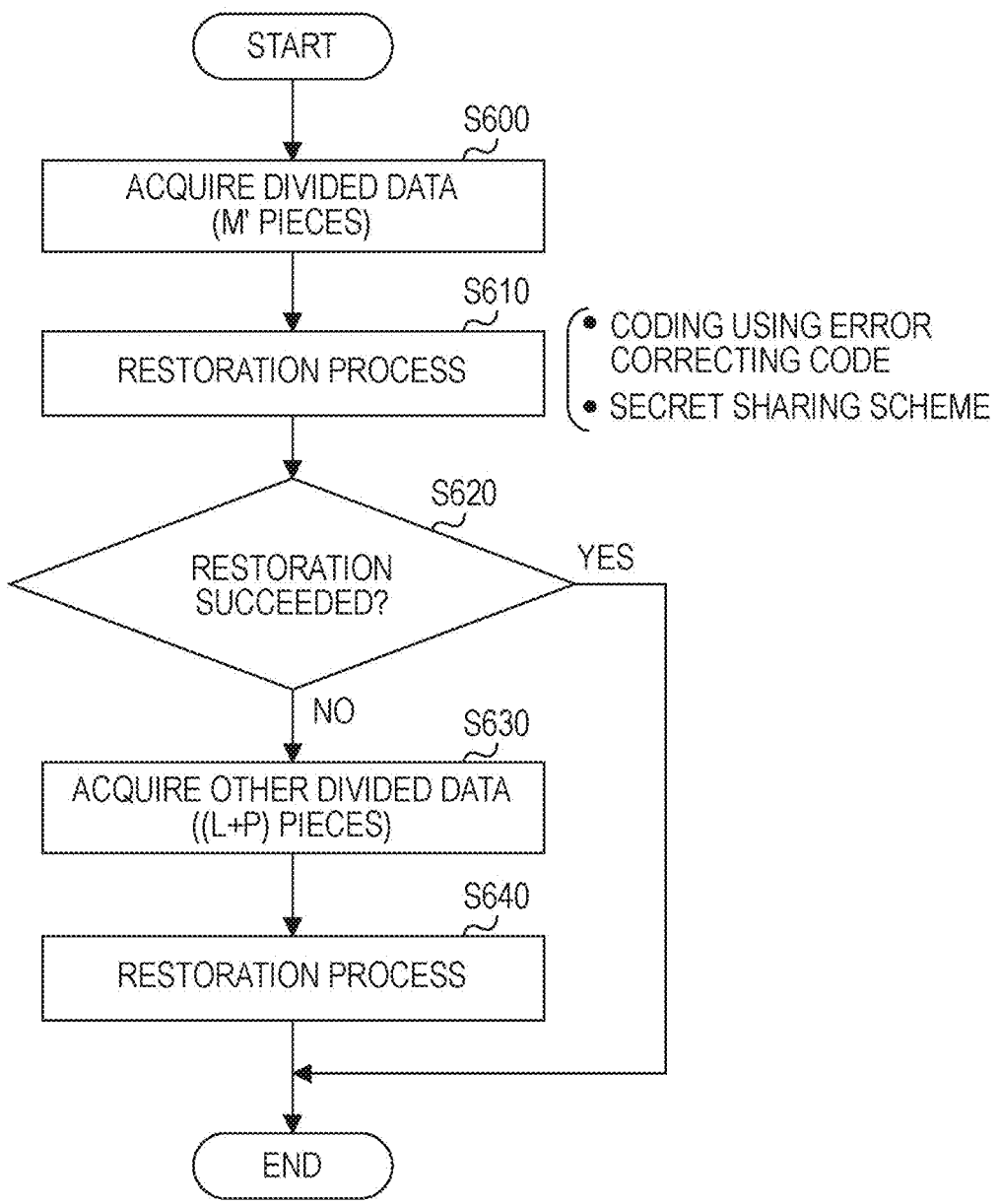
FIG. 6 is the flowchart of processes in which the pieces of divided data stored in the external storage device 30 are restored to the target information by the information processing device 20.
Figure 7:
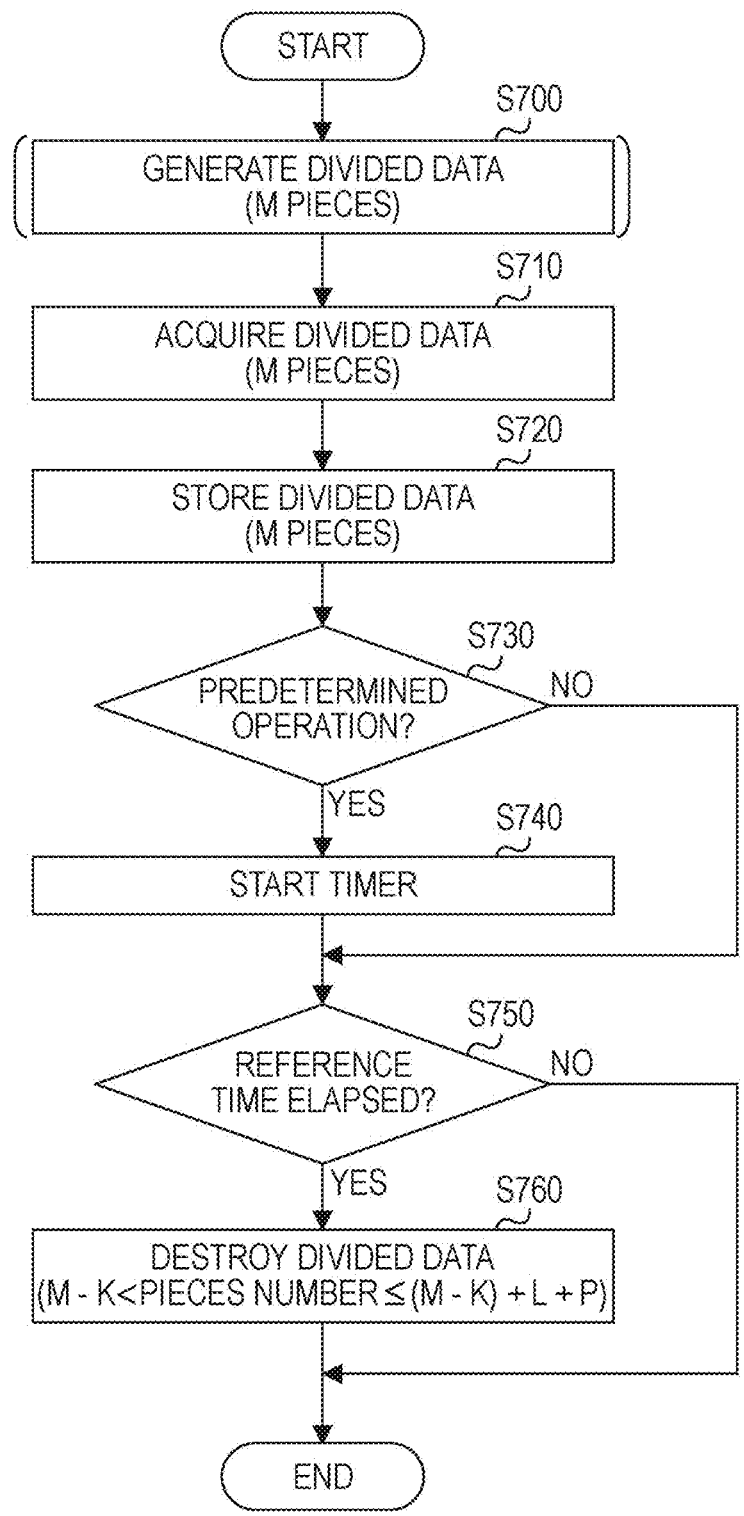
FIG. 7 is the flowchart of processes in which the pieces of divided data are stored and then destroyed by the external storage device 30.
Figure 8:
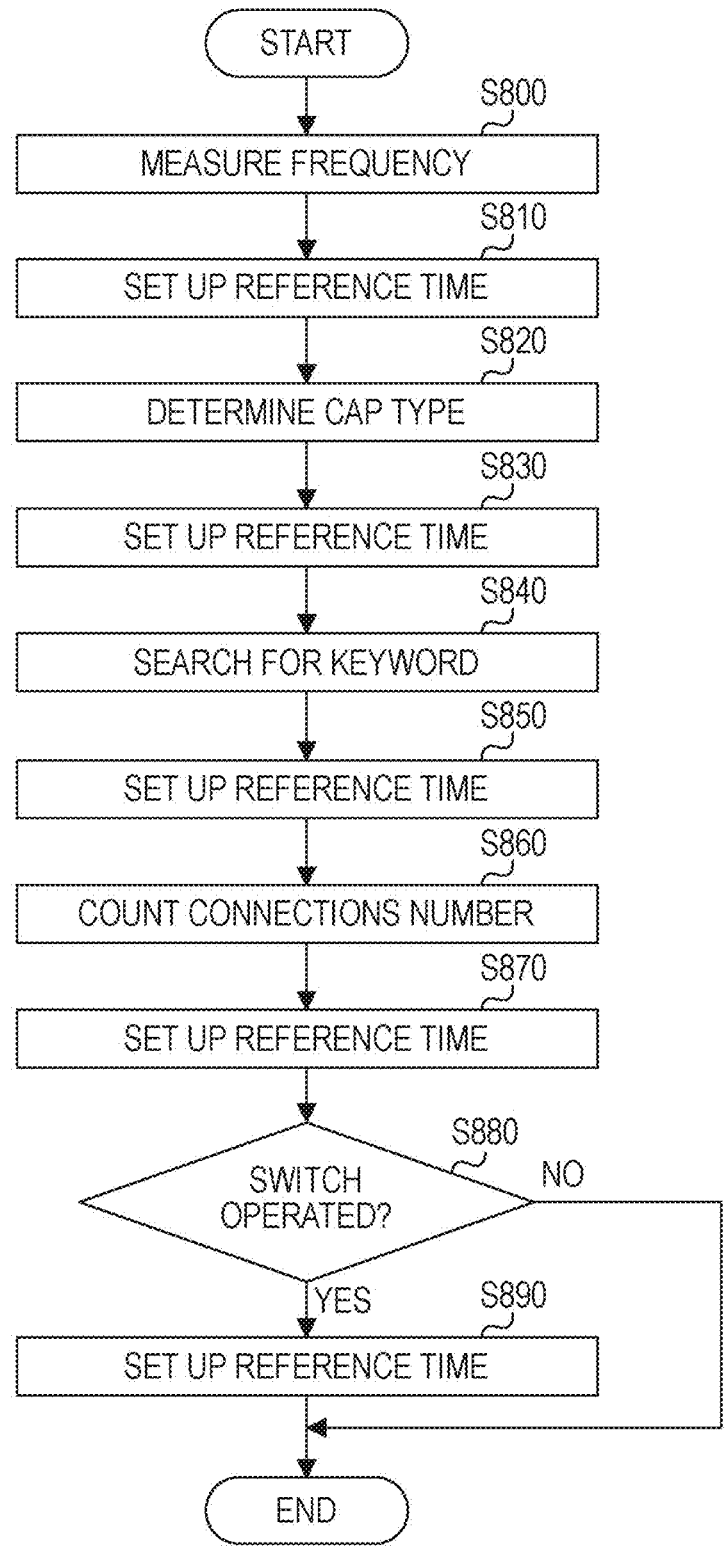
FIG. 8 is the flowchart of processes in which a reference time is set up by the external storage device 30.
Figure 9:
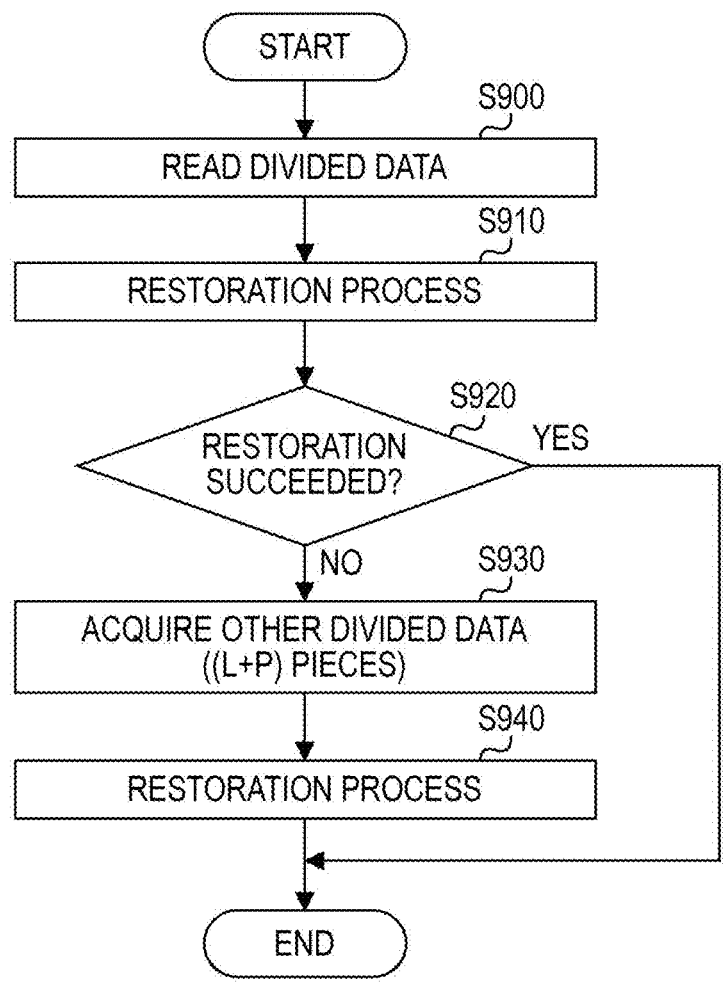
FIG. 9 is the flowchart of processes in which the stored pieces of divided data are restored to the target information by the external storage device 30 on the basis of the stored other pieces of divided data.
Figure 10:
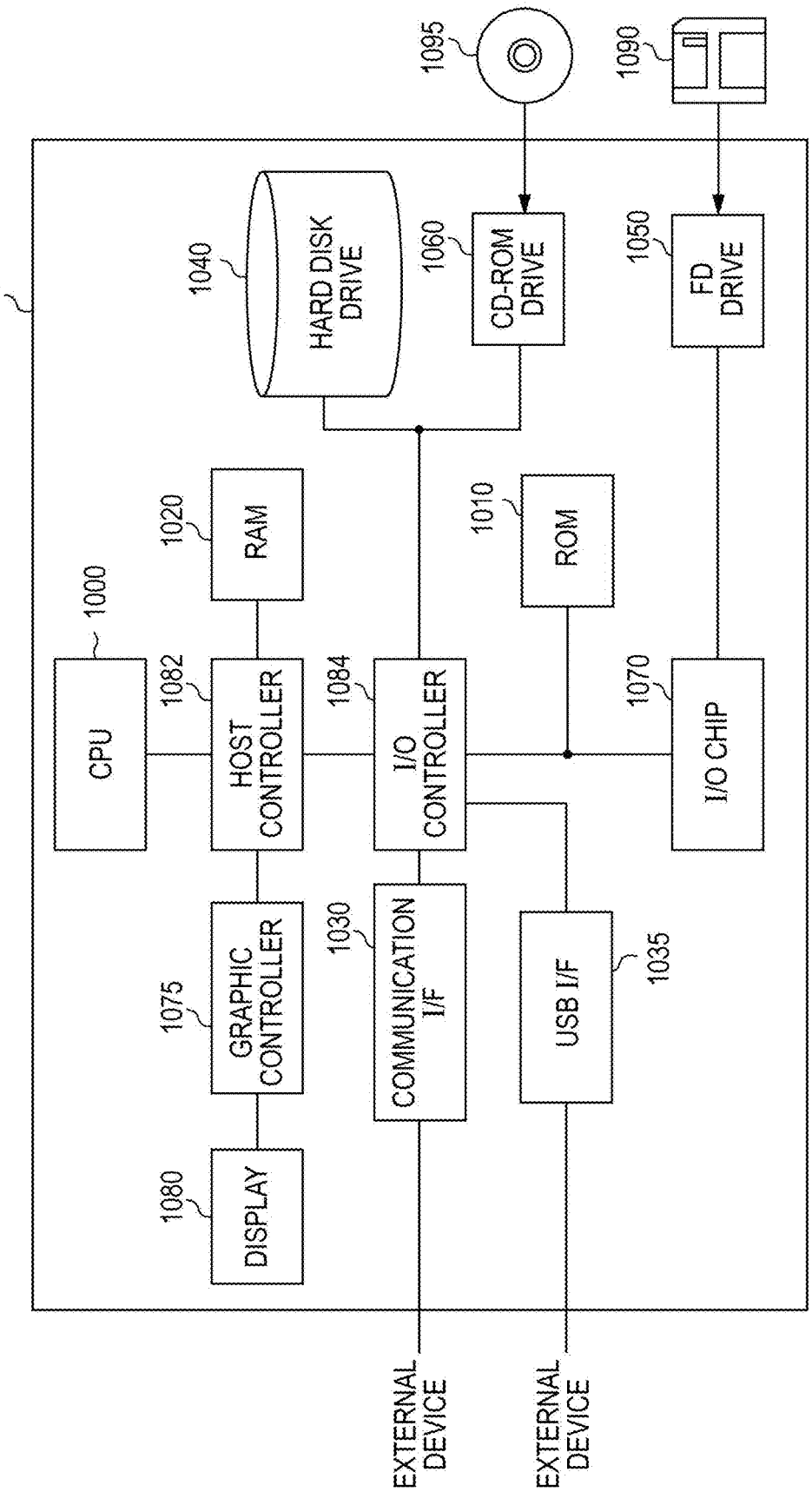
FIG. 10 is an example of the hardware configuration of the information processing device 20.

10: information system
20: information processing device

30: external storage device
32: switch
35: cap
200: memory device
205: first storage unit
208: target information
210: communication I/F
220: first generation unit
230: output unit
240: first storage execution unit
250: registration unit
260: first restoration unit
300: second storage unit
310: second generation unit
320: acquisition unit
330: second storage execution unit
340: data destruction unit
350: setup unit
360: setup control unit
365: measurement unit
370: cap determination unit
375: keyword search unit
380: connection count unit
390: second restoration unit

The invention claimed is:

1. A method for processing information, said method comprising:
   dividing, by an apparatus, target information into N pieces of divided data using a secret sharing scheme in which a predetermined number (K) of pieces of the N pieces of divided data is required to restore the target information, wherein N>K, and wherein the apparatus is an information processing device that stores the N pieces of divided data;
   said apparatus selecting M pieces from the N pieces, wherein K>0 and K<M<N;
   after said selecting M pieces, said information processing device transmitting the selected M pieces to an external storage device that is external to the information processing device, said transmitting resulting in the M pieces being stored in the external storage device which limits a totality of pieces of the N pieces being stored on the external storage device to the M pieces;
   after said transmitting the M pieces, restoring, in the information processing device, the target information from at least K pieces of the N pieces, and
   after said restoring, destroying only D pieces of the M pieces in the external storage device, wherein D>M−K and D<M.

2. The method of claim 1, wherein a remaining N−M pieces results from said selecting the M pieces from the N pieces, and wherein the method further comprises:
   after said transmitting the selected M pieces and before said restoring the target information, storing L pieces of the remaining N−M pieces in the information processing device, wherein D≤M−K+L.

3. The method of claim 2, wherein a remaining N−M−L pieces results from said storing L pieces, and wherein the method further comprises:
   after said storing L pieces and before said restoring the target information, registering P pieces of the remaining N−M−L pieces with an external server, wherein D≤M−K+L+P; and
   said information processing device receiving M' pieces of the M pieces from the external storage device, wherein said restoring is performed by the information processing device and comprises utilizing the M' pieces.

4. The method of claim 3, wherein M'≥K, and wherein the at least K pieces consist of the M' pieces.

5. The method of claim 3, wherein M'<K, wherein the method further comprises said information processing device accessing the L pieces and the P pieces, and wherein the at least K pieces comprise the M' pieces, the L pieces, and the P pieces.

6. The method of claim 1, wherein said restoring is performed by the external storage device, wherein the at least K pieces consist of M' pieces of the M pieces, wherein M'≥K, and wherein the method further comprises said external storage device transmitting the restored target information to the information processing device.

7. The method of claim 1, wherein said destroying comprises:
   randomly selecting at least one bit in each piece of the D pieces; and
   after said randomly selecting at least one bit in each piece of the D pieces, inverting a value of each bit of the at least one bit in each piece of the D pieces.

8. The method of claim 7, wherein said dividing the target information comprises using an encoding scheme that employs an error correcting code, and wherein the at least one bit in each piece of the D pieces consists of a number of bits that is larger than a correction limit of the error correcting code.

9. The method of claim 1, wherein the method further comprises:
   after said storing the M pieces and before said destroying D pieces, said external storage device ascertaining that a predetermined operation has been performed with respect to the external storage device and that a reference time has elapsed since the predetermined operation was performed, wherein said destroying in response to said ascertaining.

10. The method of claim 9, wherein the predetermined operation is:
    a removal of the external storage device from the information processing device, said removal having occurred after insertion of the external storage device into the information processing device; or
    an operation of a switch comprised by the external storage device, wherein said operation of a switch has resulted in the external storage device receiving the reference time or a destruction rate according to which said destroying is to be performed.

11. The method of claim 9, wherein the reference time is:
    a function of a measured frequency at which the external storage device is connected to the information processing device;
    a function of a shape or color of a cap placed on a connection terminal of the external storage device;
    a function of a keyword used as a key in a search that retrieved a file comprising the keyword in the M pieces of divided data stored in the external storage device; or
    a function of a type of a predetermined operation received by a switch comprised by the external storage device.

12. A system comprising a computer readable external storage device and an information processing device, said information processing device and said external storage device configured to perform a method for processing information, said method comprising:
    an apparatus dividing target information into N pieces of divided data using a secret sharing scheme in which a predetermined number (K) of pieces of the N pieces of divided data is required to restore the target information, wherein N>K, and wherein the apparatus is an information processing device that stores the N pieces of divided data;

said apparatus selecting M pieces from the N pieces, wherein K>0 and K<M<N;

after said selecting M pieces, said information processing device transmitting the selected M pieces to an external storage device that is external to the information processing device, said transmitting resulting in the M pieces being stored in the external storage device which limits a totality of pieces of the N pieces being stored on the external storage device to the M pieces;

after said transmitting the M pieces, restoring, in the information processing device, the target information from at least K pieces of the N pieces, and after said restoring, destroying only D pieces of the M pieces in the external storage device, wherein D>M−K and D<M.

13. The system of claim 12, wherein a remaining N−M pieces results from said selecting the M pieces from the N pieces, and wherein the method further comprises:

after said transmitting the selected M pieces and before said restoring the target information, storing L pieces of the remaining N−M pieces in the information processing device, wherein D≤M−K+L.

14. The system of claim 12, wherein said restoring is performed by the external storage device, wherein the at least K pieces consist of M' pieces of the M pieces, wherein M≥K, and wherein the method further comprises said external storage device transmitting the restored target information to the information processing device.

15. The system of claim 12, wherein said destroying comprises:

randomly selecting at least one bit in each piece of the D pieces; and after said randomly selecting at least one bit in each piece of the D pieces, inverting a value of each bit of the at least one bit in each piece of the D pieces.

16. The system of claim 12, wherein the method further comprises:

after said storing the M pieces and before said destroying D pieces, said external storage device ascertaining that a predetermined operation has been performed with respect to the external storage device and that a reference time has elapsed since the predetermined operation was performed, wherein said destroying in response to said ascertaining.

17. A computer program product, comprising a computer readable storage device having computer readable program code stored therein, said program code containing instructions executable, by a computer readable external storage device or by both the external storage device and an information processing device, to implement a method for processing information, said method comprising:

an apparatus dividing target information into N pieces of divided data using a secret sharing scheme in which a predetermined number (K) of pieces of the N pieces of divided data is required to restore the target information, wherein N>K, and wherein the apparatus is an information processing device that stores the N pieces of divided data;

said apparatus selecting M pieces from the N pieces, wherein K>0 and K<M<N;

after said selecting M pieces, said information processing device transmitting the selected M pieces to an external storage device that is external to the information processing device, said transmitting resulting in the M pieces being stored in the external storage device which limits a totality of pieces of the N pieces being stored on the external storage device to the M pieces;

after said transmitting the M pieces, restoring, in the information processing device, the target information from at least K pieces of the N pieces, and after said restoring, destroying only D pieces of the M pieces in the external storage device, wherein D>M−K and D<M.

18. The computer program product of claim 17, wherein the method further comprises:

after said storing the M pieces and before said destroying D pieces, said external storage device ascertaining that a predetermined operation has been performed with respect to the external storage device and that a reference time has elapsed since the predetermined operation was performed, wherein said destroying in response to said ascertaining.

* * * * *